(12) United States Patent
Courteaux (10) Patent No.: US 8,954,869 B2
(45) Date of Patent: Feb. 10, 2015

(54) GENERATING A FRONT END GRAPHICAL USER INTERFACE FOR A PLURALITY OF TEXT BASED COMMANDS

(75) Inventor: Francis Courteaux, Le Cres (FR)

(73) Assignee: International Business Machines Corporation, Armonk, NY (US)

( * ) Notice: Subject to any disclaimer, the term of this patent is extended or adjusted under 35 U.S.C. 154(b) by 1470 days.

(21) Appl. No.: 12/335,626

(22) Filed: Dec. 16, 2008

(65) Prior Publication Data

US 2009/0158153 A1 Jun. 18, 2009

(30) Foreign Application Priority Data

Dec. 17, 2007 (EP) ...................................... 07301684

(51) Int. Cl.
G06F 3/00 (2006.01)
G06F 3/048 (2013.01)
G06F 9/44 (2006.01)
G06F 3/0484 (2013.01)
G06F 3/0483 (2013.01)

(52) U.S. Cl.
CPC ................ *G06F 8/38* (2013.01); *G06F 3/0484* (2013.01); *G06F 3/0483* (2013.01)
USPC ............................. 715/762; 715/810; 715/708

(58) Field of Classification Search
CPC ............................. G06F 3/0484; G06F 3/0483
USPC .......................................... 715/762, 810, 708
See application file for complete search history.

(56) References Cited

U.S. PATENT DOCUMENTS 5,640,541 A * 6/1997 Bartram et al. ................. 703/26
5,812,851 A    9/1998 Levy et al.
5,883,623 A * 3/1999 Cseri ............................. 715/866
6,141,660 A * 10/2000 Bach et al. ............................ 1/1
6,570,591 B1 * 5/2003 Crovetto et al. ............... 715/763
6,671,691 B1 * 12/2003 Bigus .................................... 1/1
6,724,408 B1 * 4/2004 Chen et al. ..................... 715/853
6,907,572 B2 * 6/2005 Little et al. ..................... 715/762
6,917,928 B1 * 7/2005 Pellinat ........................... 706/59
7,177,843 B2 * 2/2007 Nguyen et al. .................. 705/51
7,234,111 B2 * 6/2007 Chu et al. ...................... 715/251

(Continued)

OTHER PUBLICATIONS

Schummer et al. Project Plan UP-6 Domain Independent Visual XML Editor. Version 1.2. Nov. 25, 2005 [online]. Retrieved from the Internet: <http://www.uta.fi/~wenfeng.liu/documents/Project_Plan-v1.2_final.pdf>.

(Continued)

*Primary Examiner* — Ece Hur
(74) *Attorney, Agent, or Firm* — The Steadman Law Firm PLLC; Thomas E. Tyson (57) ABSTRACT

A method, computer program product, and system are disclosed for generating a graphical user interface (GUI) for a plurality of text based commands, in which environment mapping definitions may link generic GUI components with predefined command structures. The plurality of text based commands may be command-line interface (CLI) commands. The environment mapping definitions may be applied to a command specification defining characteristics of the plurality of text based commands in a standard format in order to build a GUI from generic GUI components. The command specification may be generated by providing an interpretation reference defining CLI conventions and parsing a command description to extract the command specification with reference to the interpretation reference.

18 Claims, 6 Drawing Sheets

(56) References Cited

U.S. PATENT DOCUMENTS

| | | | |
|---|---|---|---|
| 7,337,406 B2* | 2/2008 | Imataki | 715/762 |
| 7,478,380 B2* | 1/2009 | Schmidt et al. | 717/162 |
| 7,581,190 B2* | 8/2009 | Pintos et al. | 715/762 |
| 7,958,454 B2* | 6/2011 | Gaudette | 715/763 |
| 8,683,359 B2* | 3/2014 | Jugel | 715/762 |
| 2002/0091818 A1* | 7/2002 | Cascio et al. | 709/224 |
| 2003/0069955 A1* | 4/2003 | Gieseke et al. | 709/223 |
| 2003/0074636 A1 | 4/2003 | Manepalli | |
| 2003/0210275 A1* | 11/2003 | Draschwandtner et al. | 345/810 |
| 2004/0163090 A1* | 8/2004 | Ledru et al. | 719/320 |
| 2005/0010901 A1* | 1/2005 | Udler | 717/109 |
| 2005/0188339 A1* | 8/2005 | Anderson | 716/11 |
| 2006/0129980 A1* | 6/2006 | Schmidt et al. | 717/114 |
| 2006/0158459 A1* | 7/2006 | Ferguson et al. | 345/619 |
| 2006/0259870 A1* | 11/2006 | Hewitt | 714/762 |
| 2007/0139430 A1* | 6/2007 | Korn et al. | 345/581 |
| 2008/0189250 A1* | 8/2008 | Cha et al. | 707/3 |
| 2009/0007009 A1* | 1/2009 | Luneau et al. | 715/808 |
| 2009/0013284 A1* | 1/2009 | Chen | 715/810 |
| 2009/0055738 A1* | 2/2009 | Acedo et al. | 715/708 |
| 2009/0055757 A1* | 2/2009 | Chaney | 715/762 |
| 2009/0172541 A1* | 7/2009 | Acedo et al. | 715/708 |
| 2009/0199187 A1* | 8/2009 | Cervantes et al. | 718/101 |
| 2011/0035688 A1* | 2/2011 | Kinoshita et al. | 715/763 |
| 2014/0214731 A1* | 7/2014 | Granny et al. | 706/11 |

OTHER PUBLICATIONS

Ali Mesbah. Web-based XML Editing with W3C XML Schema and XSLT. [online] [retrieved on Dec. 12, 2008] Retrieved from the Internet: <http://www.xml.com/pub/a/2003/04/30/editing.html>, <http://www.xml.com/pub/a/2003/04/30/editing.html?page=2>.

Eric Gropp. Transforming XML Schemas. [online] [retrieved on Dec. 12, 2008]. Retrieved from the Internet: <http://www.xml.com/pub/a/2003/01/15/transforming-schemas.html>, <http://www.xml.com/pub/a/2003/01/15/transforming-schemas.html?page=2>.

* cited by examiner

| ISEXTPOOL | | | | ? | |
|---|---|---|---|---|---|
| DEV | | | | | |
| STORAGE_IMAGE_ID | | | | | |
| DEFAULT ◉  FULLID ☑ ← 411 | | | | | |
| LONG ○ | | | | | |
| SHORT ○ ← 410 | | | | | |
| FRNT | HDR<br>ON ◉<br>OFF ○ | P<br>ON ◉<br>OFF ○ | HMC1 | R | |
| DEFAULT ◉ | BNR<br>ON ◉<br>OFF ○ | V<br>ON ◉<br>OFF ○ | HMC2 | DELIM | |
| XML ○ | | | | | |
| DELIM ○ | | | | | |
| STANZA ○ | RANKGRP<br>0 ◉<br>1 ○ | STGTYPE<br>FB ◉<br>CKD ○ | USER<br>USERNAME | PASSWD<br>PASSWORD | |
| CANCEL | | RESET | | SUBMIT | |

GENERATING A FRONT END GRAPHICAL USER INTERFACE FOR A PLURALITY OF TEXT BASED COMMANDS

RELATED APPLICATION

This application claims priority under 35 U.S.C. §119 to European Patent Application No. 07301684.2 filed Dec. 17, 2007, the entire text of which is specifically incorporated by reference herein.

FIELD OF THE INVENTION

The various embodiments described herein relate to the automatic generation of a front end graphical user interface (GUI) for a given command-line interface (CLI).

BACKGROUND OF THE INVENTION

Command-line interfaces (CLIs) are a common means for enabling human-machine interaction and are particularly useful for issuing instructions to computers or similar machines.

With CLIs, a sequence of commands may be executed in a safe and repeatable way. All commands are written in a script and may be fully tested. All storage-specific scripts may be included in the classical application scripts and be executed automatically from servers.

CLIs are generally easier to use if a user can remember or easily find the commands and options, which generally is the case if they are frequently used or when full documentation is available. To facilitate generation of CLI commands, a front end GUI may be created so that a user may select commands and may flag options via a menu in order to generate one or more clean commands. Without a front end GUI, syntax errors or other errors are more likely.

A classical CLI command consists of the following components, arranged in the following order:
command name;
command flags and flag parameters; and
one or more command parameters, each followed by any required sub parameters.

Flags modify the command. They provide additional information that directs the CLI to perform the command task in a specific way. For example, the -v flag tells the CLI to display the command results in verbose mode. Some flags may be used with every CLI command. Others are specific to a particular command and are invalid when used with other commands. Flags are preceded by a hyphen (-) and may be followed immediately by a space and a flag parameter.

Flag parameters provide information required to implement the command modification that is specified by a flag. For example, the -user flag requires a user_name parameter, and the -passwd flag requires a password parameter. Flag parameters are variables; their values change to meet specific needs. Not all flags require parameters. In such case, the flag itself provides all of the necessary information. Some flag parameters are optional. Moreover, some flag parameters may allow the use of multiple values. Such multiple values must be separated with a comma, with no white space between the values.

The following is an example demonstrating the use of flag parameters:

chsession -dev IBM.2107-75L3221 -lss 50 -action add -volume 2000,5000,5001 FB

In the example, the flag -volume is using multiple flag parameters, which are the comma-separated 2000,5000,5001.

A command parameter provides basic information necessary to perform the command task.

The following is an example demonstrating the use of command parameters:

mkpprcpath -wait yes -dev IBM.2107-75L3221 -remotewwnn 5005076303FFC0B7 -remotedev IBM.2107-7506551 -srclss 50 -tgtlss 80 -consistgrp I000:I010 I010:I011

In the example, mkpprcpath is the command name; -wait, -dev, -remotewwnn, -remotedev, -srclss, -tgtlss, and -consistgrp are command flags; and yes and no are the only valid flag parameters for the -wait flag. IBM.2107-75L3221 is the flag parameter for the -dev flag. The -consistgrp flag does not have a corresponding flag parameter. I000:I010 I010:I011 is a list of command parameters without flags.

These flags and parameters are not straightforward, and thus many errors may arise if the command is built manually. The objective of the various embodiments described herein is to reduce such errors by providing a structured file and a program parsing such file so that a GUI generating commands, flags, and parameters may be built.

For example, all of the well-known disk bays and related software listed in Table 1 use CLI commands to configure and monitor storage for servers.

TABLE 1

| Storage Unit | CLI name | Website |
| --- | --- | --- |
| ESS | ESSCLI | http://www.redbooks.ibm.com/abstracts/sg245420.html |
| DS4000 | SMcli | http://www.redbooks.ibm.com/abstracts/sg247010.html?Open |
| DS6000 | DS CLI | http://www.1.ibm.com/support/docview.wss?uid=ssg1S7001162&aid=1 |
| DS8000 | DS CLI | http://www.1.ibm.com/support/docview.wss?uid=ssg1S7001162&aid=1 |
| TPC | TPCTOOL | http://publib.boulder.ibm.com/infocenter/tivihelp/v4r1/index.jsp?topic=/com.ibm.itpc.doc/fqz0_tpccli3123.htm |
| TSM | dsmc | http://submit.boulder.ibm.com/tividd/td/TSMC/GC32-0789-03/fr_FR/HTML/ans5000009.htm#HDRCOMLINE |
| SVC | svcinfo svctask | http://www.03.ibm.com/servers/storage/software/visualization/svc/index.html |
| Brocade switch | CLI | http://www.128.ibm.com/developerworks/tivoli/library/t-switchts/index.html |
| Cisco switch | SAN-OS CLI | http://www.cisco.com/univercd/cc/td/doc/product/software/ios120/12cgcr/fun_c/fcprt1/fcui.htm |
| McData switch | CLI | http://www.mcdata.com/partners/openready/develop/OPENInterfaces.html |

However, each CLI is different, using commands and flags in many ways to accomplish the common tasks of creating volumes and assigning such volumes to servers. Thus, according to known implementations, each time one decides to use a new storage box, it is necessary to learn and use a new language.

In certain cases, a front end GUI (i.e., graphical front end) is available to offer a graphical interface to the underlying CLI. Examples include easy_dscli (Front End GUI for DS8000/DS6000 DS CLI) or Scripting Tools for SAN Volume Controller.

In the IT industry generally, front end GUIs are available for some command line programs. An example is kdesu, which is a graphical front end for the su (i.e., substitute user) command in UNIX. Likewise, kcron is a graphical front end to cron, which is a command line program used to schedule tasks. Perhaps the most famous tool is the System Management Interface Tool (SMIT) for Advanced Interactive executive (AIX) administration (AIX is a series of operating systems developed by IBM).

While front end GUIs offer certain advantages in terms of usability, they are also associated with certain problems. One problem with front end GUIs is that they frequently lack the versatility and fine-grained control of their underlying command line programs. Specifically, they have limited options for modifying the behavior of commands and cannot be combined with other commands using pipes (pipes allow commands to perform highly specialized tasks that otherwise would be very difficult to perform). Moreover, front end GUIs generally attempt to hide the finally executed CLI command, and as a result the end user is unable to reuse the same action in autonomous scripts. Another drawback is that a front end GUI must be completely redesigned and recreated for each CLI, and a classical end user generally will not have the capability of adding new commands or new flags and options to the front end GUI.

A number of responses to these issues have been suggested. U.S. Publication No. 2003/0074636 relates to a method for generating GUIs from Document Type Definition (DTD) files. DTD files are used to express a schema that describes a document or a portion of a document. A DTD file for which a GUI is to be generated is parsed to identify the different elements present in the DTD file. The elements identified are represented in the form of a binary tree-like data structure. The binary tree-like data structure is used at run-time to quickly generate the GUI. The generated GUI may be used by a user to enter data.

U.S. Pat. No. 5,812,851 relates to a method and system for dynamically loading compiler back ends for variable compilation outputs. The system as disclosed includes a generic back end that is capable of interacting with a number of independent back ends that are loaded at run time. The independent back ends create their own back end tree that is adapted to the outputs of the generic back end. The system further includes a front end that produces an abstract syntax tree from an input source code file. The generic back end provides an interface for communication between the front end and each individual back end.

U.S. Publication No. 2005/0010901 relates to method for generating a GUI. A code corresponding to each GUI element is stored. The GUI elements may include text boxes, drop-down boxes, check boxes, radio buttons, etc. When a request from a user system for a specific GUI element is received along with certain parameters, the corresponding code is used to generate a generic version of the GUI element requested. The generic version of the GUI element then is modified based on the parameters passed on by the user system.

The article "Domain Independent Visual XML Editor: Version 1.2", by Jörg Schummer, Tayyab Zaheer, Wenfeng Liu, Ahmer Iqbal, Jari Kivelä, and Juuso Näsi, relates to a Domain Independent Visual XML Editor. The Domain Independent Visual XML Editor provides functions that XML users may use to generate a GUI directly from the XML schema. In the event that the XML schema is not available, it may be extracted from XML document itself. The Domain Independent Visual XML Editor generates a graphical representation of the XML schema, which is used by a user to interact.

The article "Web-based XML Editing with W3C XML Schema and XSLT" (Source: http://www.xml.com/pub/a/2003/04/30/editing.html), by Ali Mesbah, and the article "Transforming XML Schemas" (Source: http://www.xml.com/pub/a/2003/01/15/transforming-schemas.html), by Eric Gropp, relate to a method for editing a XML instance document through an automatically created form-based GUI, based on the schema of the XML instance document. The schema information is available in a XML Schema Definition (XSD) document. The method as disclosed creates an input field in the GUI corresponding to each element in the XSD document.

SUMMARY OF THE INVENTION

A method for generating a graphical user interface (GUI) for a plurality of text based commands, a method for generating a command specification defining characteristics of a plurality of text based commands, a computer program product comprising instructions for carrying out the method for generating a GUI, and a system adapted to implement the method for generating a GUI are provided in the appended claims.

The method for generating a GUI may comprise applying environment mapping definitions to a command specification defining the structure of the plurality of text based commands in a standard format, wherein the environment mapping definitions may link generic GUI components with predefined command structures. Additionally, the method may comprise building the GUI from the generic GUI components via an interface generator. Furthermore, the method may comprise using a list of instructions to parse a description file, which is at least partially based on the command specification, in order to retrieve components and/or structures of the plurality of text based commands. The environmental mapping definitions may map the predefined command structures onto the GUI components, or vice versa. The predefined command structures may comprise arguments, and such arguments may comprise one or more command flags, flag parameters, command parameters, and/or sub parameters. The GUI may account for all structures of the plurality of text based commands.

The command specification may be modified (e.g., as necessary or as desired by a user). The plurality of text based commands may be command-line interface (CLI) commands. The command specification may be a flat file. Moreover, the command specification may be a XML file. Furthermore, the command specification may be a relational database. The command specification may define characteristics of multiple commands, and it may define the relationship between each of the multiple commands and the relationship between flags and parameters in each of the multiple commands.

The method for generating the command specification may comprise providing an interpretation reference defining CLI conventions and parsing a command description to extract the command specification with reference to the interpretation reference. The command description may be human-readable. Furthermore, the command description may be a help file or a help file extract.

Further advantages of the various embodiments described herein will become clear to the skilled individual upon examination of the drawings and detailed description. The various exemplary embodiments are not meant to limit the scope of the disclosure, and thus it is intended that any additional advantages in accordance with the disclosure be incorporated herein.

BRIEF DESCRIPTION OF THE DRAWINGS

Various exemplary embodiments will now be described with reference to the accompanying drawings in which like references denote similar elements, in which.

DETAILED DESCRIPTION

Figure 1:
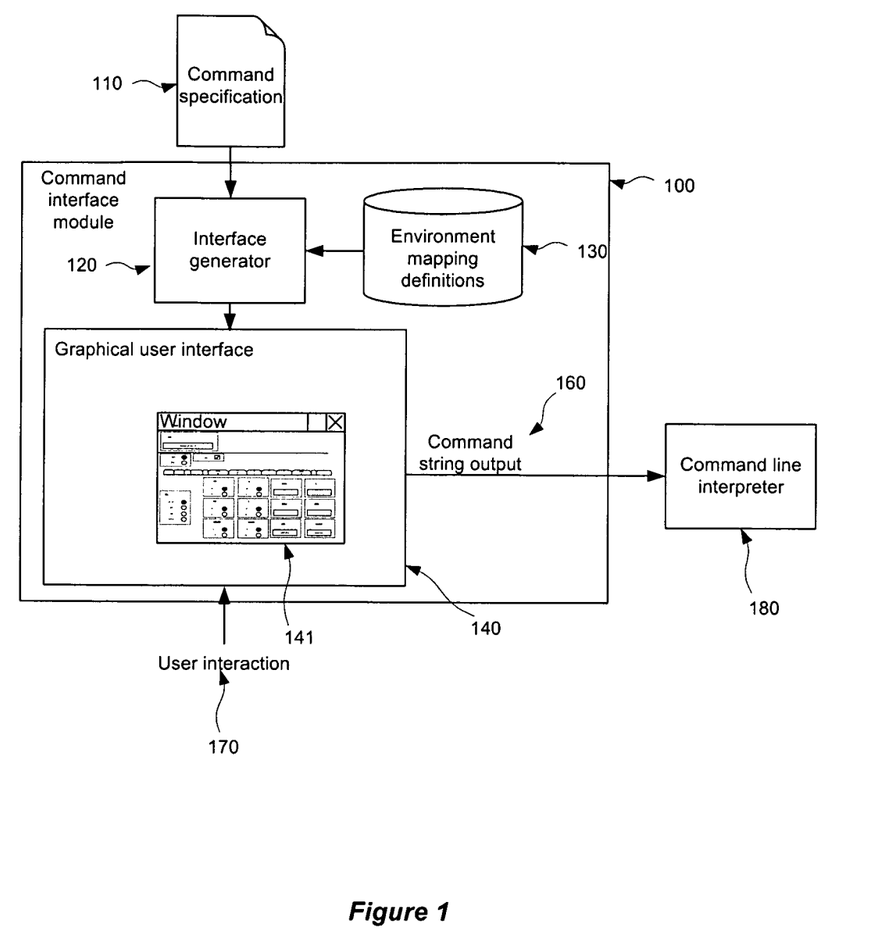
FIG. 1 provides functional elements for an implementation in accordance with an exemplary embodiment.

FIG. 1 provides functional elements for an implementation in accordance with an exemplary embodiment. A command interface module 100 may comprise environment mapping definitions 130, which may link generic graphical user interface (GUI) components with predefined command structures. Specifically, the generic GUI components may be mapped onto the predefined command structures, or vice versa. The environment mapping definitions 130 may be applied to a command specification 110, which defines the structure of the particular command in question in a standard format. By application of the environment mapping definitions 130, a GUI 140 may be built by an interface generator 120 from the generic GUI components so as to provide a GUI for the command. The GUI 140 may include a window 141.

The command specification 110 may define according to a standard, predefined format all of the characteristics that define the command (or commands, in the case where the command specification 110 defines multiple commands). Such characteristics may comprise the command name or command names, the command flags and flag parameters belonging to such flags, and one or more command parameters belonging to the command or commands. The parameters may be followed by any sub parameters that may be required. The command specification 110 should contain all necessary information concerning command syntax and structure so that valid commands may be compiled solely on the basis of the information contained therein.

The skilled individual will appreciate that the usual palette of generic GUI components may provide a range of components, each suitable for embodying different aspects of a command structure. For example, radio buttons may enable the exclusive selection of a single element from a short list of possibilities. Moreover, check boxes may enable the selection of one or more elements from a short list of possibilities or may indicate that a single option is or is not required. List boxes or drop-down lists may be suitable for selecting elements from a larger number of possibilities and generally may be configured to enable a single selection or a plurality of selections. Text boxes may be used to receive character input from a user and may be configured to accept text in a particular format, a particular number of characters, etc. Code may be provided to check input characters against certain required criteria. Buttons may be used to trigger specific events, such as the clearing of selections already made, the submission of selections, access to a subsidiary part of the interface, etc. Tabs may allow the grouping of different user interface components (e.g., according to theme or function) so that the user may conveniently access related interface components. The skilled individual familiar with the various GUI components in common use will readily appreciate their respective suitability for the realization of different command features.

According an exemplary embodiment, the GUI 140 may comprise a user interface that allows end users to interact with programs or computer-controlled devices, e.g., by means of generic GUI components. Such GUI components may comprise graphical icons; visual indicators, or special graphical elements called "widgets", "popup windows", or "scrolled windows"; and/or text labels or text navigation to represent the information and actions available to a user. User interaction may be captured in any suitable manner as may occur to the skilled individual, such as via direct manipulation of the graphical elements or via using conventional input devices such as a mouse, keyboard, touch screen, trackerball, joystick, etc.

In accordance with an exemplary embodiment, the environment mapping definitions 130 may define, for the environment in which the GUI is to be used, which generic GUI components are available in such environment, and which GUI component is to be used for command components satisfying certain criteria. The environment mapping definitions 130 may define a generic GUI component or combination thereof for every conceivable command component. The environment mapping definitions 130 also may provide configuration details or accompanying code to modify the behavior of certain generic GUI components so that they correspond to the particular requirements of a given command. For example, if a command allows the definition of up to three alternative routing mechanisms from a list of ten, the environment mapping definitions 130 may specify the use of a multiple selection dropdown list, which may be further modified or configured to allow no more than three selections. According to an exemplary embodiment, code libraries for the generation of GUI components may be defined as a part of the command interface module 100, specifically for use in generating command interfaces. Moreover, the shared code libraries associated with the local operating system may be identified by reference in the environment mapping definitions 130 via application programming interface (API) calls or the like.

The skilled individual may imagine numerous possible mappings of different command structures onto generic GUI components (or numerous possible mappings of generic GUI components onto different command structures). For example, the GUI 140 may comprise menus structured by command families, with one line per command. Popup windows may be used to change the value for each flag. Values may be presented in drop down lists and the like. The mappings may be defined in the environment mapping definitions 130, and the command specification 110 may be fed into the environment mapping definitions 130 to be processed according to the same principles, leading to a recognizable look and feel to interfaces produced by the environment mapping definitions 130. User interaction 170 with the GUI 140 may produce a complete command string output (i.e., output command string) 160, ready to be executed against a target system, e.g., a command line interpreter 180. The command line interpreter 180 may be a text terminal, terminal emulator, remote shell client, etc.

The interface generator 120 may be capable of optimizing the generated GUI 140 so as to fit all interface elements onto the available display surface in as ergonomic manner as possible. This may require that the interface generator 120 retrieve data concerning issues such as display resolution from the local operating system, etc.

The GUI 140 may be generated in real time whenever required. Accordingly, any modifications (e.g., updates) to the command specification 110 may change the behavior of the GUI 140, and the resulting command string output 160 may comprise flags and parameters according to the new command specification 110.

Similarly, the GUI 140 may be continuously or repeatedly updated substantially in real time on the basis of the command specification 110, and accordingly any modifications to the command specification 110 may be reflected immediately in the GUI 140.

The GUI 140 may be implemented via a list of instructions in any suitable programming language (e.g., Java, C++, Perl, etc.) that is able to parse a description file, which may be at least partially based on the command specification 110, in order to retrieve the components and/or structures for the command or commands at issue, interact with the end user using a GUI, and build the full command line with all required flags, flags parameters, and command parameters.

Figure 2:
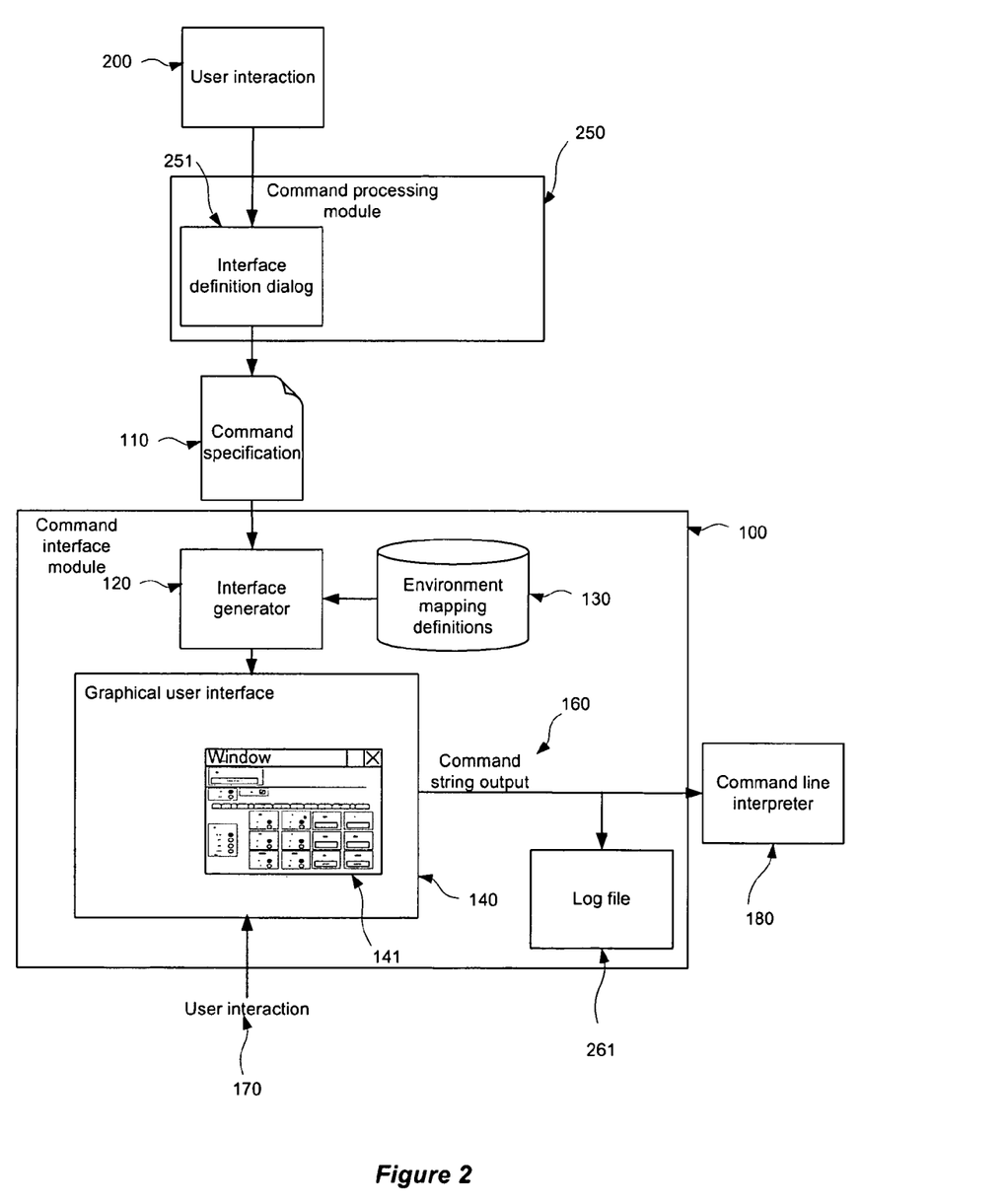
FIG. 2 provides functional elements implementing a development in accordance with an exemplary embodiment.

FIG. 2 provides functional elements implementing a development in accordance with an exemplary embodiment. There may be provided a command processing module 250 adapted to create the command specification 110.

The command specification 110 may be derived via a number of different approaches. For instance, as illustrated in FIG. 2, the command specification 110 may be derived primarily from user interaction (i.e., user input) 200 with the command processing module 250. The user interaction 200 may be driven by an interface definition dialog 251 forming part of the command processing module 250.

The interface definition dialog 251 of the command processing module 250 may drive the user interaction 200 step-by-step in the process of deriving the command specification 110. The user may determine the default choice for the flags, etc. The command specification 110 may be updated easily to introduce, e.g., new commands or new flags for a specific command via the interface definition dialog 251. The interface definition dialog 251 may process the user interaction 200 and any relevant stored data to generate a new command specification 110 for use by the command interface module 100 as described herein.

During operation of the command interface module, all output command strings 160 may be stored in a log file 261 and/or may be displayed in a log window (not shown). During execution, all return messages similarly may be stored in the log file 261 or elsewhere in order to facilitate reusability of the output command strings 160.

Figure 3:
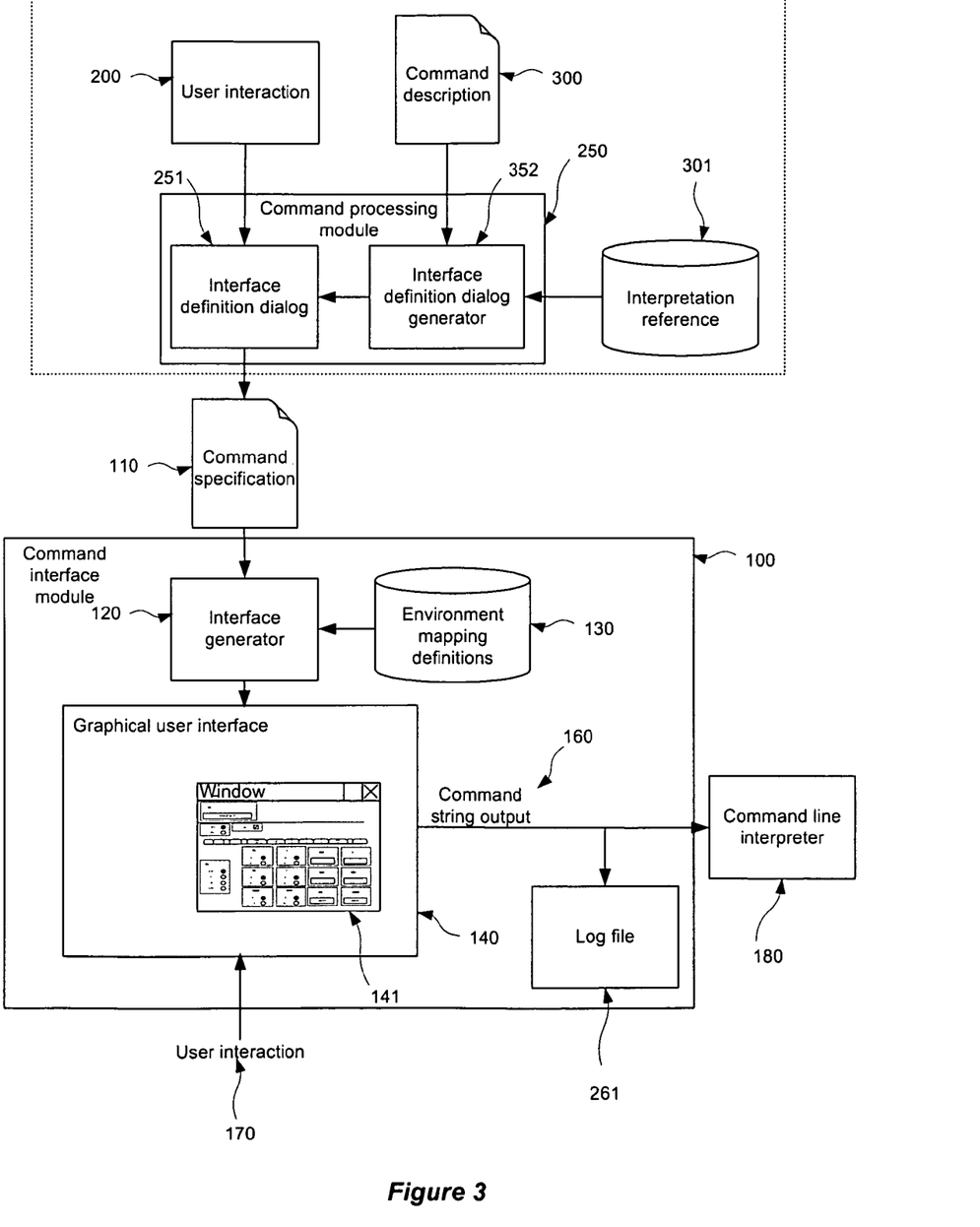
FIG. 3 provides functional elements implementing a further development in accordance with an exemplary embodiment.

FIG. 3 provides functional elements implementing a further development in accordance with an exemplary embodiment. As shown in FIG. 3, the command processing module 250 further comprises an interface definition dialog generator 352, which generates a customized interface definition dialog 251 based on pre-existing information concerning the command or commands at issue. Such pre-existing information may comprise formalized representations.

In many environments, formalized representations of available commands exist. Such formalized representations may specify many, if not all, of the available parameters, flags, etc. for available commands. Moreover, such formalized representations generally may specify which elements are required and which are optional, what format the input must take, what values will be applied by default, etc.

Consider the DS CLI command-line interface referred to in Table 1 herein (refer to the website document referenced in Table 1 with respect to the DS CLI entries). Consider, for example, the lsextpool command for the DS CLI has the function of displaying a list of extent pools in a storage unit and status information on each extent pool in the list. The formal definition of the lsextpool command is as follows:
lsextpool [ -help|-h|-? ] [-l (long)|-s (short)] [-fmt default|xml|delim|stanza] [-p on|off] [-delim char] [-hdr on|off] [-bnr on|off] [-r #] [-v on|off] [-fullid] [-hmc1 SMC1] [-hmc2 SMC2] [-user username] [-passwd password] -dev storage_image_ID [-stgtype fb|ckd] [-rankgrp 0|1]

According to the formal representation of the lsextpool command, certain symbols have certain special meanings, as described in Table 2:

TABLE 2

| – (minus) or / (slash) sign | Flags are prefixed with a – (minus) sign. Flags define the action of a command or modify the operation of a command. Multiple flags, followed by parameters, may be used upon issuance of a command. |
| [ ] square brackets | Optional values are enclosed in square brackets. |
| { } braces | Required or expected values are enclosed in braces. |
| \| vertical bar | A vertical bar indicates that there is a choice between two or more options or arguments. |
| . . . ellipsis | An ellipsis signifies the values that may be repeated on the command line or multiple values or arguments. |
| - dash | A dash indicates that, as an alternative to entering the parameter, a value or values are supplied from stdin. stdin varies depending on the settings and is available in single-shot or script mode. This option is not available in interactive mode. |

For example, in accordance with Table 2, [a|b] indicates that a user may choose 'a', 'b', or nothing, while {a|b} indicates that a user must choose either 'a' or 'b'.

The skilled individual will appreciate that virtually all command-line interfaces provide a formal representation similar to the above-described formal definition of the lsextpool command, and such formal representations often follow to some extent the conventions set out in Table 2.

As shown in FIG. 3, a command description 300 according to a formal description as described above may be provided for the command or commands at issue in conjunction with the user interaction 200. Furthermore, an interpretation reference 301 may be provided that contains the information necessary to understand the command description 300. By applying the interpretation reference 301 to the command description 300, the interface definition dialog generator 352 may automatically determine many aspects of the command specification 110, leaving the user to add any missing information, modify default values, etc. via the interface definition dialog 251.

Accordingly, a method is provided for generating a command specification 110 defining the structure of a plurality of text based commands suitable for use in generating a GUI for such plurality of commands as described with reference to FIG. 1. The method may comprise providing an interpretation reference 301 defining command-line interface conventions and parsing a command description 300 with reference to the interpretation reference 301 in order to extract the command specification 110 via the command processing module 352.

Figure 4:
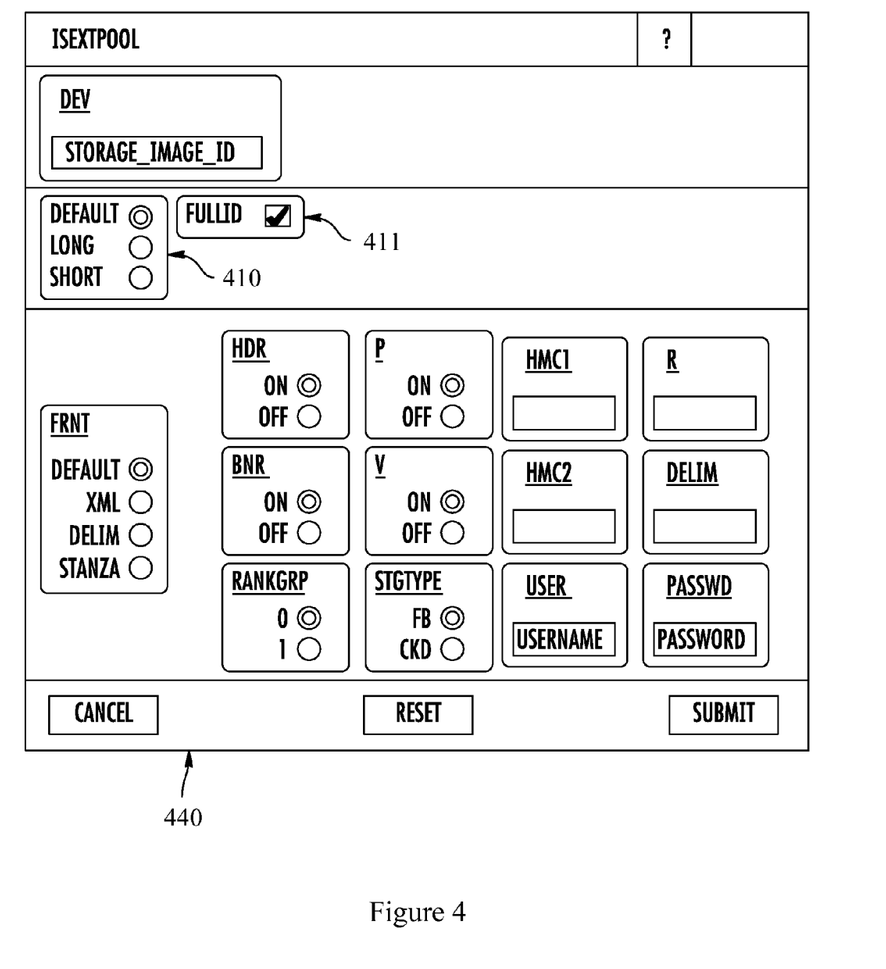
FIG. 4 provides a graphical user interface (GUI) in accordance with an exemplary embodiment.

FIG. 4 shows an exemplary GUI 140 as may be derived from the lsextpool command. As shown in FIG. 4, a GUI window 440, entitled "lsextpool", may be provided that is similar to the kind used in many well-known operating systems. The GUI window 440 may comprise a number of boxes 410, 411, etc., each corresponding to a particular flag or parameter. The box may comprise the name of the flag or parameter and a generic GUI component appropriate to the nature of the flag or parameter. For example, the box 410 relates to the flag options -l and -s in the formal definition of the lsextpool command (see herein); either -l (long) or -s (short) may be selected, or alternatively no entry need be made. Accordingly, the box 410 may comprise radio buttons "Long", "Short", or "Default", with the radio button "Default" being selected when the interface is initiated. Similarly, the box 411 may relate to the switch -fullid, which may or may not be selected. Accordingly, the box 411 may comprise a check box for the user to indicate that the switch should be implemented. According to the formal definition of the lsextpool command (see herein), no -fullid switch need be selected, and thus by default -fullid is not implemented. However, the box 411 may be checked by the user. This scenario provides an example of how a user may modify the default behavior of a command via the GUI 140. The GUI window 440 further may provide buttons marked "Cancel", "Reset", and "Submit". Selecting the button marked "Cancel" may close the GUI window 440. Selecting the button marked "Reset" may revert all interface components to their initial state. Selecting the button marked "Submit" may cause the compilation and submission of a command string output 160 as described herein, incorporating the command accompanied by such flags, parameters, etc. necessary to reflect the selections made by the user.

The command specification 110 as discussed with respect to any of FIGS. 1 through 3 may assume the form of a human-readable file describing components and structure of a command or commands. Such file may be a flat file with a structure based on a grammar annotated similarly to a XML document and/or may be structurally similar to a relational database. Based on a structuring schema, such file may be viewed as a database structure and may be queried and updated as such.

For example, for the following mkflash command, if the flag -record is there, then the -persist flag also must be provided in the command:
mkflash -record -persist -seqnum 0000 7001:7000 EF04: EE04

For the resyncflash command, when referencing the command parameters 7001:7000 EF04:EE04, the two flags -record and -persist also must be included in the command:
resyncflash -record -persist -seqnum 0001 7000:7001 EF04: EE04 6200:6201

The structured file representing such links for the resyncflash command may be presented as follows:

```
<FLAG>
    <NAME> -record </NAME>
        <CHOICE>Y/N</CHOICE>
        <DEFAULT>Y</DEFAULT>
        <LINK> -persist <CHOICE> Y </CHOICE> </LINK>
</FLAG>
```

As mentioned herein, a command specification 110 is not necessarily limited to a single command. Where a command specification 110 defines a number of commands (e.g., a command family), information defining the relationship between such commands may be included as desired. Such information may indicate the relationship between a command and its command family. Such information may define, e.g., the order in which a sequence of commands should be presented (e.g., in the GUI for the command family) or submitted.

For example, to create a mirror between two sites using large disk bays, the following eight steps are followed:
Step 1: describe the two sites with Disk Bay Serial Number and World Wide Node Name;
Step 2: describe the volume set, giving the list of volumes to be mirrored in the two sites;
Step 3: create a logical path between logical subsystems;
Step 4: start a synchronous mirror;
Step 5: monitor the mirror;
Step 6: suspend the mirror;
Step 7: resume the mirror with a different option, such as using asynchronous functionality; and
Step 8: terminate the mirror.

Creating a mirror as described above necessitates a command family. In the command specification 110, eight commands will be in the "mirror" command family, and the positions of the commands within the family may be as follows:
Family=mirror
cde=describesite position=1
cde=describevolset position=2
cde=mkpprcpath position=3
cde=mkpprc position=4
cde=lspprc position=5
cde=pausepprc position=6
cde=resumepprc position=7
cde=rmpprc position=8
EndFamily As seen above, the commands in this family are not in alphabetic order as they are in all official reference books, but rather they are in the order as expected by the end user. Because end user expectations may also vary depending on culture or specific usages, it is possible for end users to change this description as desired in order to create a personalized GUI with customized commands, flags, and parameters.

Figure 5:
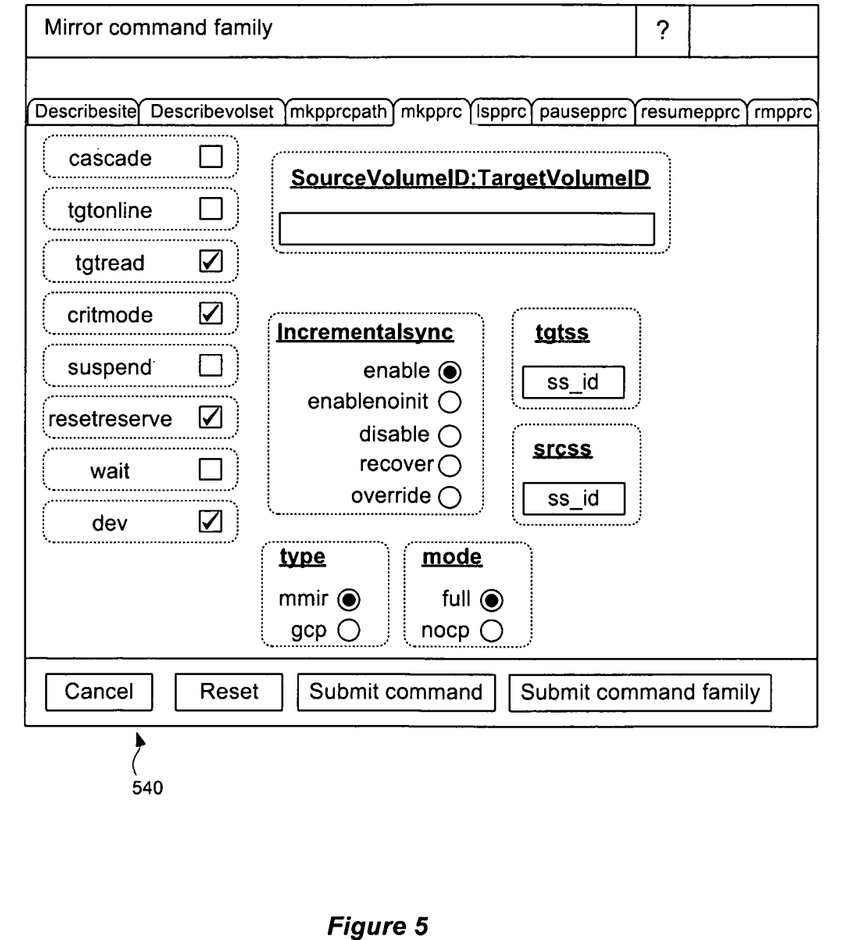
FIG. 5 provides a further GUI in accordance with an exemplary embodiment.

FIG. 5 shows an exemplary GUI 140 as may be derived from the "mirror" command family as described above. FIG. 5 provides a GUI window 540 similar to the GUI window 440 described with reference to FIG. 4. The GUI window 540 may bear the title of the command family (entitled "Mirror command family") and may provide tabs corresponding to each of the eight commands making up the "mirror" command family as described above. As shown, the mkpprc command tab may be selected, and accordingly the various GUI components corresponding to the parameters, flags, etc. associated with this command may be displayed. The GUI window 540 further may provide buttons marked "Cancel", "Reset" and "Submit command", with functions equivalent to those described with respect to the analogous buttons in FIG. 4. Furthermore, a "Submit command family" button may be provided, which may cause the compilation and submission of a command string output 160 as described above incorporating in sequence each of the eight commands defined in the "mirror" command family, with each command accompanied by the flags, parameters, etc. necessary to reflect the selections made by the user in the corresponding tab. To address the case in which some commands of the command family already have been submitted, a further option of submitting only the commands necessary to complete the command family also may be provided.

The implementations described herein with reference to FIGS. 1 through 5 may be embodied as a method, a computer program product, or a system. To summarize what has been described herein, such a method, computer program product, or system may be used to generate a GUI for a text based command or group of commands, in which environment mapping definitions link generic GUI components with command structures. The environment mapping definitions may be applied to a command specification defining the structure of the command or group of commands in a standard format in order to build a GUI from generic GUI components. The command specification may be generated by providing an interpretation reference defining command-line interface conventions and parsing a command description with reference to the interpretation reference in order to extract the command specification via a command processing module.

Figure 6:
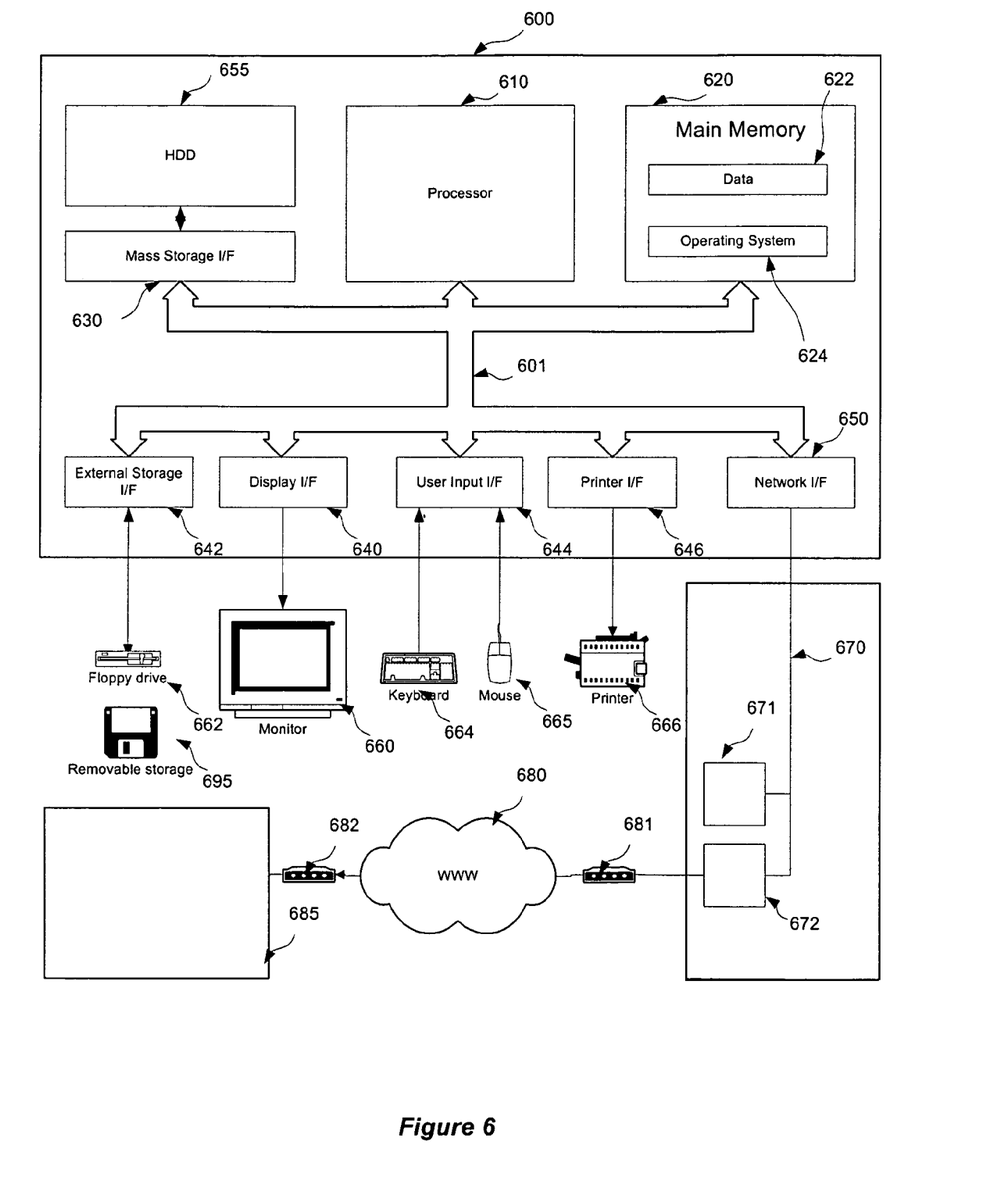
FIG. 6 provides an exemplary computer system suitable for implementation of various embodiments.

FIG. 6 provides an exemplary computer system 600 suitable for implementation of various embodiments. The computer system 600 may comprise a processor 610, a main memory 620, a mass storage interface 630, a display interface 640, and a network interface 650. These system components may be interconnected through the use of a system bus 601. The mass storage interface 630 may be used to connect mass storage devices such as a hard disk drive (HDD) 655 to the computer system 600. One specific type of removable storage interface drive may be a floppy disk drive 662, which may store data to and read data from a removable storage (e.g., floppy disk) 695. Other types of computer-readable storage media may be envisaged, such as a readable and optionally writable compact disc drive (e.g., a CD-ROM or CD-RW drive). Furthermore, a user input interface 644 may be provided to receive user interactions from interface devices such as a mouse 665 and a keyboard 664. Additionally, a printer interface 646 may be provided to send and optionally receive signals to and from a printer 666.

A main memory 620 in accordance with an exemplary embodiment may comprise data 622 and an operating system 624. The computer system 600 may utilize well-known virtual addressing mechanisms that may allow the programs of the computer system 600 to behave as if they only have access to a large, single storage entity instead of access to multiple, smaller storage entities such as the main memory 620 and the HDD 655. Therefore, while data 622 and the operating system 624 are shown to reside in the main memory 620, the skilled individual will recognize that these components may not necessarily be all completely contained in the main memory 620 concurrently. It should be noted that the term "memory" is used herein to generically refer to the entire virtual memory of the computer system 600.

Data 622 may represent any data that serves as input to or output from any program in the computer system 600. The operating system 624 may be a multitasking operating system known in the industry as OS/400. However, the skilled individual will appreciate that the spirit and scope of the various embodiments described herein are not limited to any one operating system.

The processor 610 may be constructed from one or more microprocessors and/or integrated circuits. The processor 610 may execute program instructions stored in the main memory 620. The main memory 620 may store programs and data that the processor 610 may access. When the computer system 600 starts up, the processor 610 initially may execute the program instructions that make up the operating system 624. The operating system 624 may be a sophisticated program that manages the resources of the computer system 600. Among such resources may be the processor 610, the main memory 620, the mass storage interface 630, the display interface 640, the network interface 650, and the system bus 601.

Although the computer system 600 is shown to contain only a single processor and a single system bus, the skilled individual will appreciate that the various embodiments described herein may be implemented using a computer system with multiple processors and/or multiple buses. In addition, the interfaces that are used according to an exemplary embodiment each may comprise separate, fully programmed microprocessors used to off-load compute-intensive processing from the processor 610. However, the skilled individual will appreciate that the disclosure applies equally to computer systems that use I/O adapters to perform similar functions.

The display interface 640 may be used to directly connect one or more displays (e.g., monitors) 660 to the computer system 600. The displays 660, which may be non-intelligent (i.e., dumb) terminals or fully programmable workstations, may be used to allow system administrators and users to communicate with the computer system 600. Note, however, that while the display interface 640 is provided to support communication with one or more displays 660, the computer system 600 does not necessarily require a display 660, because all necessary interaction with users and other processes may occur via the network interface 650.

The network interface 650 may be used to connect other computer systems and/or workstations to the computer system 600 via a network connection 670. The various embodiments described herein apply equally no matter how the computer system 600 may be connected to other computer systems and/or workstations, and regardless of whether the network connection 670 is made using present-day analog and/or digital techniques or via some networking mechanism of the future. In addition, many different network protocols may be used to implement a network, such protocols being specialized computer programs allowing computers to communicate across the network connection 670. TCP/IP (Transmission Control Protocol/Internet Protocol) is an example of a suitable network protocol that may be used to enable communication over an Ethernet network. As shown, the network connection 670 may connect the computer system 600 to two network devices 671 and 672, which may comprise computer systems similar to the computer system 600 or may comprise other network-capable devices such as printers, routers, etc. In the present example, the network device 672 may be an LCL server, which may be connected via a modem 681 to a public network 680 such as the World Wide Web. A connection to a remote device or system 685 may be established via the public network 680.

It is important to note that while the various embodiments described herein have been and will continue to be described in the context of a fully functional computer system, the skilled individual will appreciate that the various embodiments are capable of being distributed as a product in a variety of forms and that the disclosure applies equally regardless of the particular type of media used to actually carry out the distribution. Examples of suitable signal-bearing media include: recordable type media such as floppy disks (e.g., removable storage 695 of FIG. 6) and compact discs; and transmission type media such as digital and analogue communications links.

The various embodiments may assume the form of an entirely hardware embodiment, an entirely software embodiment, or an embodiment containing both hardware and software elements. The various embodiments may be implemented in software, which may include but is not limited to firmware, resident software, microcode, etc.

Furthermore, as discussed herein, the various embodiments may assume the form of a computer program product accessible from a computer-usable or computer-readable medium providing program code for use by or in connection with a computer or any other instruction execution system. For the purposes of this description, a computer-usable or computer-readable medium may be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disc-read only memory (CD-ROM), compact disc-read/write (CD-RW), and DVD.

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) may be coupled to the system either directly or through intervening I/O controllers.

Network adapters also may be coupled to the system to enable the data processing system to become coupled to other data processing systems, remote printers, or storage devices through intervening private or public networks. Modems, cable modems, and Ethernet cards are a few of the currently available types of network adapters.

The invention claimed is:

1. A method for generating a graphical user interface for a plurality of text based commands, said method comprising:
    generating a command specification defining structural aspects of said plurality of text based commands in a standard format, wherein generating said command specification comprises:
        providing an interpretation reference defining command-line interface conventions,
        automatically determining aspects of said command specification by parsing a command description via said interpretation reference, and
        performing, via an interface definition dialog, at least one of (i) adding any missing information or (ii) modifying default values;
    applying environment mapping definitions to said command specification, wherein said environment mapping definitions link generic graphical user interface components with predefined command structures, wherein said environment mapping definitions define which of said generic graphical user interface components is to be used for command components satisfying certain criteria, wherein said environment mapping definitions provide configuration details or code to modify behavior of one or more of said generic graphical user interface components to correspond to command requirements, wherein said certain criteria take into account alternatives allowed by one or more of said command components, wherein said generic graphical user interface components comprise at least one of a radio button, a check box, a list box, a drop down list, a text box, a button, or a tab, and wherein said predefined command structures comprise arguments including a command flag, a flag parameter, a command parameter, or a sub parameter; and
    updating said graphical user interface in real time on the basis of one or more modifications to said command specification.

2. The method according to claim 1, wherein said environment mapping definitions map said generic graphical user interface components onto said predefined command structures.

3. The method according to claim 1, wherein said environment mapping definitions map said predefined command structures onto said generic graphical user interface components.

4. The method according to claim 1, further comprising building said graphical user interface from said generic graphical user interface components via an interface generator.

5. The method according to claim 1, further comprising using a list of instructions to parse a description file, which is at least partially based on said command specification, in order to retrieve components or structures of said plurality of text based commands.

6. The method according to claim 1, wherein said command description is a human-readable command description describing said plurality of text based commands.

7. The method according to claim 1, wherein said command description is a help file or a help file extract.

8. The method according to claim 1, further comprising modifying said command specification.

9. The method according to claim 1, wherein said plurality of text based commands are command-line interface commands.

10. The method according to claim 1, wherein said command specification is a flat file.

11. The method according to claim 1, wherein said command specification is a XML style file.

12. The method according to claim 1, wherein said command specification is a relational database.

13. The method according to claim 1, wherein said command specification defines characteristics of multiple commands, and wherein said command specification defines a relationship between each command defined by said command specification and a relationship between flags and parameters in each command.

14. A system comprising:
    a processor; and
    a main memory storing a program, which, when executed on the processor, performs an operation for generating a graphical user interface for a plurality of text based commands, said operation comprising:
        generating a command specification defining structural aspects of said plurality of text based commands in a standard format, wherein generating said command specification comprises:
            providing an interpretation reference defining command-line interface conventions,
            automatically determining aspects of said command specification by parsing a command description via said interpretation reference, and
            performing, via an interface definition dialog, at least one of (i) adding any missing information or (ii) modifying default values;

applying environment mapping definitions to said command specification, wherein said environment mapping definitions link generic graphical user interface components with predefined command structures, wherein said environment mapping definitions define which of said generic graphical user interface components is to be used for command components satisfying certain criteria, wherein said environment mapping definitions provide configuration details or code to modify behavior of one or more of said generic graphical user interface components to correspond to command requirements, wherein said certain criteria take into account alternatives allowed by one or more of said command components, wherein said generic graphical user interface components comprise at least one of a radio button, a check box, a list box, a drop down list, a text box, a button, or a tab, and wherein said predefined command structures comprise arguments including a command flag, a flag parameter, a command parameter, or a sub parameter; and updating said graphical user interface in real time on the basis of one or more modifications to said command specification.

15. The system according to claim 14, wherein said operation further comprises building said graphical user interface from said generic graphical user interface components via an interface generator.

16. The system according to claim 14, wherein said operation further comprises modifying said command specification.

17. The system according to claim 14, wherein said environment mapping definitions map said generic graphical user interface components onto said predefined command structures.

18. The system according to claim 14, wherein said environment mapping definitions map said predefined command structures onto said generic graphical user interface components.

* * * * *